June 25, 1929.　　　　　J. L. CATO　　　　　1,718,410
AIRPLANE FUSELAGE
Filed Feb. 24, 1928　　　2 Sheets-Sheet 1
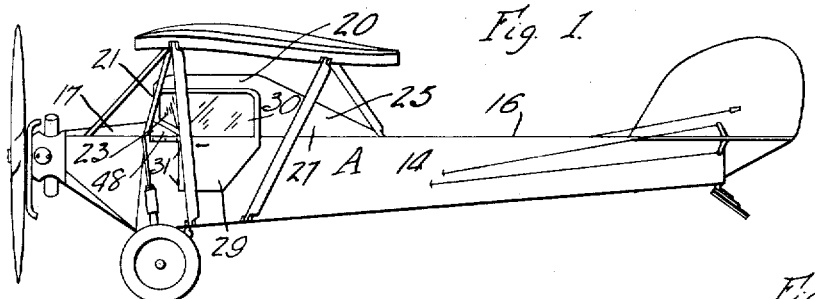
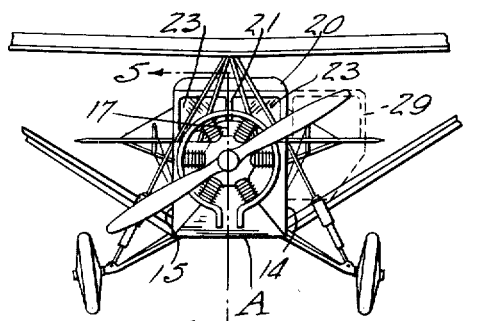
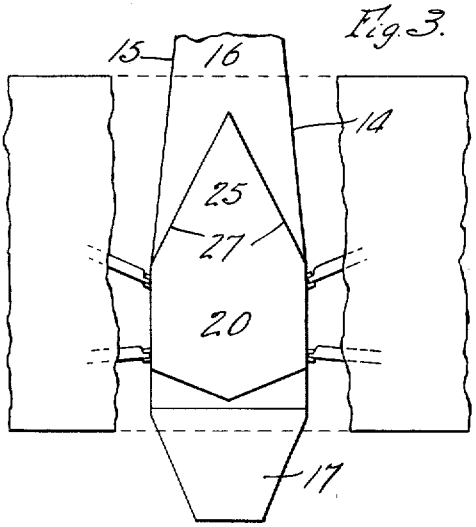
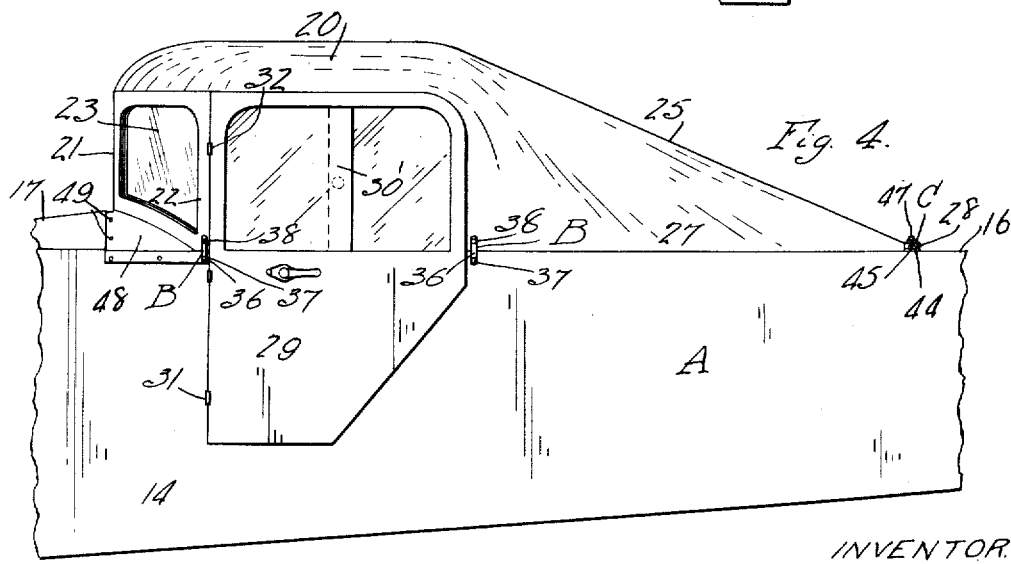
INVENTOR.
Joseph L. Cato
by Parker & Prochnow
ATTORNEYS.

June 25, 1929.                J. L. CATO                1,718,410
AIRPLANE FUSELAGE
Filed Feb. 24, 1928            2 Sheets-Sheet 2
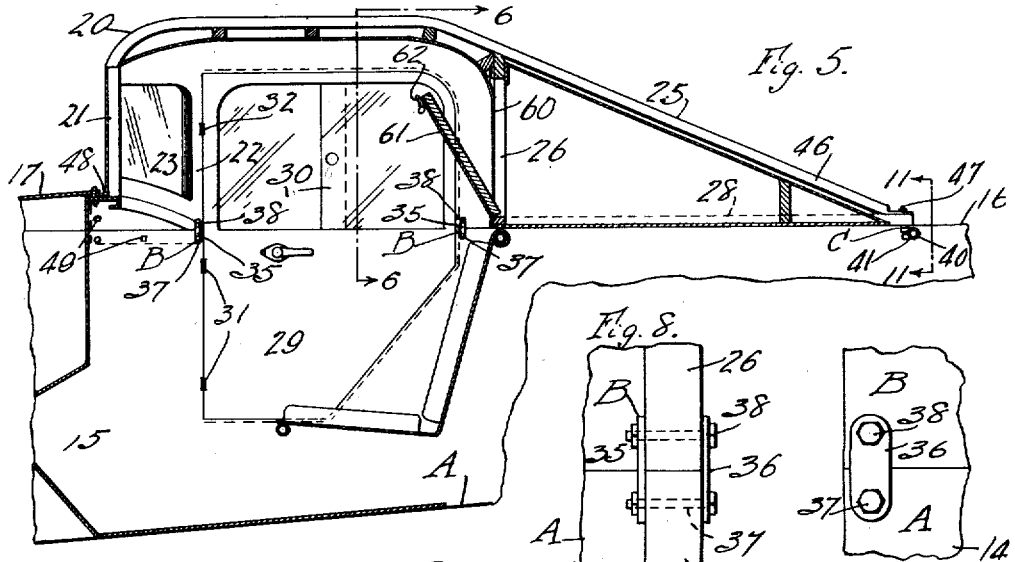
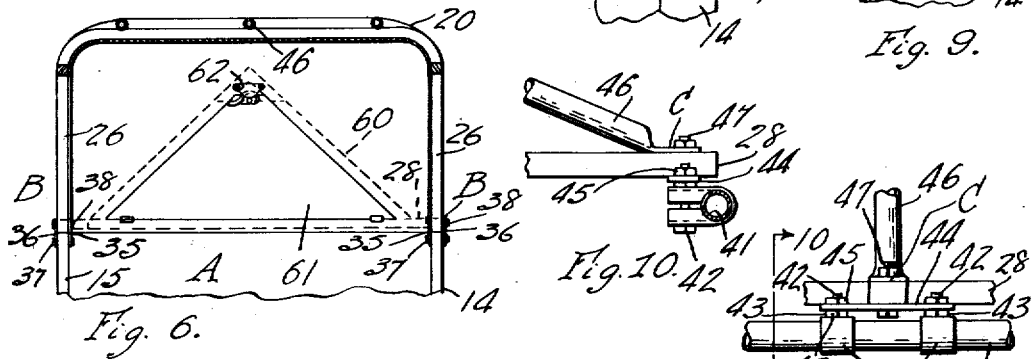
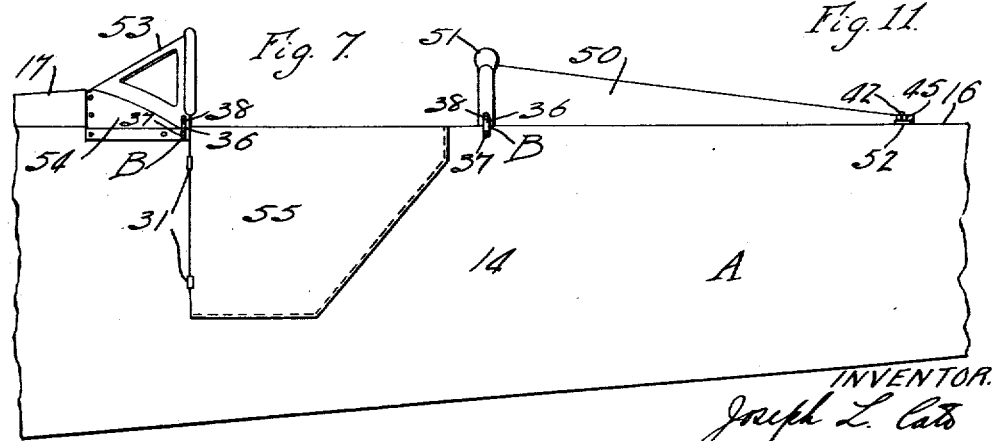
INVENTOR.
Joseph L. Cato
by Parker & Prochnow
ATTORNEYS Patented June 25, 1929.

1,718,410

UNITED STATES PATENT OFFICE.

JOSEPH L. CATO, OF BUFFALO, NEW YORK, ASSIGNOR TO G. ELIAS & BROS., INC., OF BUFFALO, NEW YORK.

AIRPLANE FUSELAGE.

Application filed February 24, 1928. Serial No. 256,707.

This invention relates to the fuselages of airplanes, and more particularly to those portions of the fuselage which accommodate the occupant or occupants of the airplane.

The objects of this invention are to provide an airplane with a fuselage which is so constructed that the same can be readily converted into either an open or closed cockpit model; also to an airplane with a removable top of improved construction; also to provide the fuselage of an airplane with means of improved construction for mounting the removable top thereon; also to provide the fuselage of an airplane with cowling of improved construction which may be used to cover a portion of the fuselage when the removable top is not used; also to improve the construction of removable enclosures for airplane bodies in other respects hereinafter specified.

In the accompanying drawings,

Fig. 1 is a side view of an airplane fuselage embodying this invention and provided with a removable top for enclosing the cockpit of the airplane.

Fig. 2 is a fragmentary, front elevation thereof.

Fig. 3 is a fragmentary, top plan view thereof with a portion of the plane broken away to show the fuselage.

Fig. 4 is a fragmentary side view of the fuselage, on an enlarged scale, showing the enclosed top in place thereon.

Fig. 5 is a fragmentary, central sectional elevation of the fuselage on line 5—5, Fig. 2.

Fig. 6 is a transverse, sectional elevation thereof on line 6—6, Fig. 5.

Fig. 7 is a fragmentary view of the fuselage showing the same with the enclosed top removed and with removable cowling mounted on the fuselage.

Fig. 8 is a fragmentary transverse elevation, on a still larger scale, showing one of the fastening devices for holding either the removable top or the removable cowling in place.

Fig. 9 is a fragmentary side elevation of the portion of the fuselage shown in Fig. 8.

Fig. 10 is a fragmentary, longitudinal sectional elevation on line 10—10, Fig. 11, showing the connection between the rear part of the removable top and the upper surface of the fuselage.

Fig. 11 is a fragmentary, sectional view thereof, on line 11—11, Fig. 5.

The airplane may be of any suitable or desired construction or type and includes a fuselage A having side walls 14 and 15 and a top wall or upper surface 16 terminating at its front end in an open space or cockpit for the occupant or occupants of the airplane. 17 represents the usual hood or part covering the portion of the fuselage forwardly of the cockpit.

The removable top or cover for the cockpit of the fuselage may be of any suitable or desired construction, that shown including a roof 20 which is supported from the fuselage by a plurality of upright posts or members, posts 21 and 22 being shown in the construction illustrated and being arranged under the front portion of the roof and spaced so as to support between them a windshield comprising two glass panes 23 arranged at an angle to each other at opposite sides of the center of the fuselage. The rear portion of the roof slopes backwardly as indicated at 25 to produce a streamline effect, and upright posts 26 support the intermediate portion of the roof, the rear end of the sloping portion 25 being secured to the top wall or upper surface 16 of the fuselage. Side walls 27 terminating at their lower ends in sills 28, extend rearwardly from the door openings in the removable top and enclose the space below the sloping portion 25 of the top. The upright posts 26 of the removable top terminate at their lower ends in the sills 28, which rest upon the top surface 16 of the fuselage.

The fuselage is provided in each side with a suitable opening for a door 29, and the upper portion of this door is provided with the usual glass window 30 and fits into a corresponding opening in the side of the removable top. The door shown is hinged at 31 on the fuselage and at 32 on the upright member 22 of the removable top and the hinges are preferably of such construction that the door can be readily removed and replaced by another door when the top is removed. A door arrangement of other construction may, of course, be employed, if desired.

In order to secure the removable top on the fuselage, suitable detachable connecting devices are preferably provided, by means of which the removable top can readily be secured to or removed from the fuselage. These securing devices may be arranged in any desired location. For example, such securing devices B may be arranged in rear and in front of the door opening of the fuselage as clearly shown in Fig. 4, and at the rear of the downwardly sloping portion 25 of the top as indicated at C, and, if desired, the front or windshield of the removable top may be provided with a forwardly extending substantially horizontal cowling or projection which is removably secured to the front portion 17 of the fuselage. These securing or connecting devices may be of any suitable or desired construction which enables them to be readily detached or disconnected from the removable top and in the construction shown the securing or connecting device B, as clearly illustrated in Figs. 8 and 9, includes a pair of short plates or straps 35 and 36, which are arranged on the inner and outer faces respectively of a structural member of the fuselage and of the removable top. The lower ends of these plates may be connected by means of a bolt 37 which passes through a structural member of the fuselage, and the upper ends of the plates or straps may be connected by means of a bolt 38 passing through a frame member of the removable top, for example, through the upright post 22 in the case of the connecting member located in front of the door opening, and through the sill 28 in the case of the connecting member at the rear of the door opening. By removing the bolts 38, the removable top can readily be lifted upwardly out of engagement with the plates or straps 35 and 36.

The connecting device C which connects the rear end of the removable top with the fuselage, may also be of any suitable construction, that shown including substantially U-shaped clamps 40 arranged about a structural member 41 of the fuselage which, in the construction shown, is tubular in form. The two U-shaped clamping members 40 have their open ends connected by bolts 42 having nuts 43 by means of which the U-shaped clamping members may be tightened or clamped on the tubular frame member 41, and the upper ends of these bolts 42 extend through and above the upper surface of the top wall or upper surface 16 of the fuselage. These bolts 42 are adapted to pass through apertures in a plate 44, which plate may be secured to the bolts 42 by nuts 45. This plate is suitably secured to and forms a part of the removable top, being, in the construction illustrated, connected with the end of a tubular ridge pole or top frame member 46 and the sills or lower frame members 28 of the removable top, by means of a bolt or other suitable connection 47. Consequently when it is desired to remove the top, the nuts 45 are unscrewed to permit the plate 44 and the removable top connected therewith to be moved upwardly out of its operative position on the fuselage. The nuts 45 thus clamp the sills 28 downwardly upon the top surface of the fuselage.

The front edges of the removable top are preferably secured to the top surface 17 of the fuselage by means of a forwardly projecting cowling member 48, which is rigidly secured to the removable top and which may extend for a short distance under the covering material of the top surface 17 of the fuselage. This cowling member 48 is preferably secured in place in any desired manner, for example by means of removable screws or bolts 49. By means of the construction described, a weather-tight joint is formed at the joint between the removable top and the front portion of the fuselage.

The same fastening devices which have been described may be used for holding certain cowling members in place on the fuselage when the removable top is not used. These cowling members, in the construction shown, include a rear member 50 having a frame including a front member 51 of inverted V-shape and other frame members not shown, connecting with the V-shaped member 51 and extending rearwardly and provided at their rear end with a plate 52, Fig. 7, identical with the plate 44 of the removable top, for connection with the bolts 42. The front frame member 51 is connected with the fuselage in the manner already described with reference to the removable top by the connecting members B located in rear of the door openings. In a similar manner a cowl 53 may be mounted on the fuselage in front of the cockpit by means of the same connecting devices B which hold the removable top in place, and by means of a forwardly projecting plate or part 54, corresponding to the forwardly projecting part 48 of the removable top, and which plate 54 may also be secured to the fuselage by means of the screws or fastening devices 49. When this cowling is used, as shown in Fig. 7, a door 55 is mounted on the hinges 31 in place of the door 29 already described.

The removable top of the airplane is preferably provided with a partition or wall 60 in rear of the cockpit and between the upright post 26. A substantially triangular shaped door 61 is hinged at its lower end to a transverse frame member or sill 60 of the removable top and which rests on the top surface of the fuselage. This door is provided at its upper end with a fastening device 62 of any suitable kind for holding the door in its closed position. By means of this construction the space below the sloping roof portion 25 forms a compartment for the storage of baggage or other articles, and the transverse partition 60 also serves to strengthen or brace the removable top.

By means of the construction described, the airplane can be readily converted to either an enclosed or open type, and the same fastening devices can be used for either holding the enclosed top on the fuselage or for securing the necessary cowling in place thereon, and one of the advantages of the structure disclosed is that when the airplane is thus converted into either the open or closed type, the balance of the plane in the air remains unchanged. This is due partly to the fact that the air flow from the cabin or closed top will not interfere with the tail controls. Consequently no adjustments of the wings or of the tail are necessary when converting the airplane to either the open or closed type, so that any one not skilled in airplane construction or design can make the changes necessary for conversion by merely removing the enclosed top and placing the cowling on the airplane, or vice versa.

I claim as my invention:—

1. In an airplane fuselage having a cockpit, the combination of a top removably mounted on said fuselage, said top including a portion covering the cockpit of the airplane and a rearwardly sloping portion forming a storage compartment, and a cowl member adapted when said top is removed to cover said part occupied by said rearwardly sloping portion.

2. In an airplane fuselage, the combination of a top removably mounted on said fuselage to cover the occupant of the airplane and having a portion sloping rearwardly from the upper portion of the top to the fuselage to give said top a streamline effect and forming a storage compartment, and means for removably connecting said fuselage to said removable top.

3. In an airplane fuselage, the combination of a top removably mounted on said fuselage to cover the occupant of the airplane and having a glass windshield at the front thereof and a rearwardly sloping streamline portion forming with the top of the fuselage a storage compartment, means for removably connecting said fuselage and said removable top, and a cowl member adapted to be secured by said connecting means to cover the portion of the fuselage covered by said rearwardly sloping portion.

4. In an airplane fuselage, the combination of a top removably mounted on said fuselage to cover the occupant of the airplane and having a glass windshield at the front thereof and a rearwardly sloping streamline portion forming with the top of the fuselage a storage compartment, means for removably connecting said fuselage and said removable top, and a front cowl member removably mounted on said fuselage by said connecting means when said top is removed to deflect wind upwardly over the heads of the occupants.

5. In an airplane fuselage having a cockpit provided with a door opening in a side thereof, the combination of a removable top covering said cockpit and having a portion sloping rearwardly from the upper portion of the top to the fuselage and extending over the fuselage in rear of said cockpit, fastening means arranged in front and in rear of said door opening and connecting said removable top and said fuselage, and a fastening device for connecting the rear end of said removable top with the top of said fuselage.

6. In an airplane fuselage having a cockpit provided with a door opening in a side thereof, the combination of a removable top covering said cockpit and having a rearwardly sloping portion extending over the fuselage in rear of said cockpit, fastening means arranged in front and in rear of said door opening and connecting said removable top and said fuselage, a fastening device for connecting the rear end of said removable top with the top of said fuselage, and a rear cowl member adapted to be secured to said fuselage, when said removable top is removed, by said fastening means in rear of said door opening and said fastening device.

7. In an airplane fuselage having a cockpit provided with a door opening in a side thereof, the combination of a removable top covering said cockpit and having a rearwardly sloping portion extending over the fuselage in rear of said cockpit, fastening means arranged in front and in rear of said door opening and connecting said removable top and said fuselage, a fastening device for connecting the rear end of said removable top with the top of said fuselage, a rear cowl member adapted to be secured to said fuselage, when said removable top is removed, by said fastening means in rear of said door opening and said fastening device, and a front cowl member adapted to be secured to said fuselage by said fastening means in front of said door opening.

8. In an airplane fuselage having a cockpit, the combination of a top removably mounted on said fuselage to cover said cockpit and having a rearwardly sloping streamline roof portion extending in rear of said cockpit and secured to the top of said fuselage and forming with said fuselage a storage compartment, means for releasably connecting said removable top to said fuselage, a partition in rear of said cockpit separating said storage compartment from said cockpit, and a door in said partition through which said storage compartment is accessible from said cockpit.

9. In an airplane fuselage having a cockpit, the combination of a top removably mounted on said fuselage and covering said cockpit, said top including a windshield having two parts arranged at an angle to the vertical central plane of the fuselage and connected approximately in said plane, means for removably connecting said top and said fuselage, and a front cowl member adapted to be secured to said fuselage when said top is removed and having its base portion composed of two parts arranged at an angle to each other substantially corresponding to the angle of said parts of said windshield, said front cowl member being held in place on said fuselage by said means for securing said top to said fuselage.

10. In an airplane fuselage having a cockpit provided with a door opening in a side thereof, the combination of a removable top covering said cockpit and having door openings arranged above said door openings in said cockpit, a door on said fuselage adapted to close a door opening in said cockpit and in said removable top, hinges for supporting said door on said fuselage, fastening means for removably securing said removable top on said fuselage, cowling adapted to be secured to said fuselage by said fastening means when said top is removed therefrom, and a door for closing the door opening in said cockpit only and which may be removably mounted on said hinges when said first mentioned door is removed therefrom.

11. In an airplane fuselage having a cockpit provided with a door opening in a side thereof, the combination of a removable top covering said cockpit and having door openings arranged above said door openings in said cockpit, a pair of doors for said door opening of said cockpit, one of said doors being of a size to close the door openings of said cockpit and of said removable top and being adapted for use when said removable top is used, and the other door closing only said door opening of said cockpit, and hinges on said fuselage on which either of said doors may be supported.

12. In an airplane fuselage having a cockpit provided with door openings in the sides thereof, the combination of a removable top for covering said cockpit, removable fastening devices for securing said top to said fuselage, a forwardly projecting member secured to the lower front end of said removable top, and means for removably securing said forwardly projecting member to said fuselage forwardly of said cockpit.

13. In an airplane fuselage having a cockpit provided with door openings in the sides thereof and having covering material secured on said fuselage, the combination of a removable top for covering said cockpit, removable fastening devices for securing said top to said fuselage, a forwardly projecting member secured to the lower front end of said removable top and adapted to have the front edge thereof secured under said covering material, and means for removably securing said forwardly projecting member to said fuselage.

14. In an airplane fuselage having a cockpit provided with door openings in the sides thereof, the combination of a removable top for covering said cockpit, removable fastening devices for securing said top to said fuselage, a forwardly projecting member secured to the lower front end of said removable top, a cowl member adapted to be secured to said fuselage when said removable top is removed therefrom and having a forwardly projecting member secured to the lower portion thereof, and means for removably securing the forwardly projecting member of said removable top and of said cowl member to said fuselage.

15. In an airplane fuselage having a cockpit provided with door openings in the sides thereof and having covering material secured on said fuselage, the combination of a removable top for covering said cockpit, removable fastening devices for securing said top to said fuselage, a forwardly projecting member secured to the lower front end of said removable top and adapted to have the front edge thereof secured under said covering material, a cowl member adapted to be secured to said fuselage when said removable top is removed therefrom and having a forwardly projecting member secured to the lower portion thereof, said forwardly projecting portions of said top and said cowl member being adapted to have the front edges thereof secured under said covering material, and means for removably securing the forwardly projecting member of said top and of said cowl member to said fuselage.

16. In an airplane fuselage having a cockpit, the combination of a removable top for covering said cockpit, and fastening devices for removably connecting the sides of said fuselage with the sides of said removable top and each including a pair of straps arranged at oppositely disposed portions of the inner and outer surfaces of said fuselage and removable top, and bolts extending through the straps near the ends thereof, one of said bolts passing through portions of said fuselage and the other bolt passing through portions of said top.

17. In an airplane fuselage having a cockpit and having a frame including a transverse tubular member arranged in rear of said cockpit, the combination of a removable top for covering said cockpit, removable fastening devices for connecting the sides of the fuselage with said removable top, a clamp arranged on said tubular frame member, a bolt extending through said clamp, and means for securing the rear end of said removable top to said bolt.

18. In an airplane fuselage having a cockpit and a transversely extending frame member in rear of said cockpit, the combination of a removable top for covering said cockpit and having a rearwardly sloping portion extending over said fuselage in rear of said cockpit, fastening devices for connecting the sides of said fuselage with the sides of said removable top, and a connection between said fuselage and said rearwardly sloping portion of said removable top, and comprising bolts connected with said transverse frame member of said fuselage, a plate connected to the rearwardly sloping portion of said removable top, and means for securing said plate to said bolt.

19. In an airplane fuselage having tail controls and a cockpit, the combination of a top removably mounted on said fuselage, said top including a portion covering the cockpit of the airplane and a rearwardly sloping portion extending from the upper portion of said top to a part of the fuselage located sufficiently far in front of the rear end of the fuselage so that the air flow from the cabin has no effect on the tail controls of the airplane.

JOSEPH L. CATO.

CERTIFICATE OF CORRECTION.

Patent No. 1,718,410.        Granted June 25, 1929, to

JOSEPH L. CATO.

It is hereby certified that the assignee in the above numbered patent was erroneously described and specified as "G. Elias & Bros., Inc., of Buffalo, N. Y.", whereas said assignee should have been described and specified as "G. Elias & Bro., Inc., of Buffalo, New York, as shown by the records of assignments in this office; and that the said Letters Patent should be read with this correction therein that the same may conform to the record of the case in the Patent Office.

Signed and sealed this 30th day of July, A. D. 1929.

(Seal)

M. J. Moore,
Acting Commissioner of Patents.

ber in rear of said cockpit, the combination of a removable top for covering said cockpit and having a rearwardly sloping portion extending over said fuselage in rear of said cockpit, fastening devices for connecting the sides of said fuselage with the sides of said removable top, and a connection between said fuselage and said rearwardly sloping portion of said removable top, and comprising bolts connected with said transverse frame member of said fuselage, a plate connected to the rearwardly sloping portion of said removable top, and means for securing said plate to said bolt.

19. In an airplane fuselage having tail controls and a cockpit, the combination of a top removably mounted on said fuselage, said top including a portion covering the cockpit of the airplane and a rearwardly sloping portion extending from the upper portion of said top to a part of the fuselage located sufficiently far in front of the rear end of the fuselage so that the air flow from the cabin has no effect on the tail controls of the airplane.

JOSEPH L. CATO.

CERTIFICATE OF CORRECTION.

Patent No. 1,718,410.  Granted June 25, 1929, to

JOSEPH L. CATO.

It is hereby certified that the assignee in the above numbered patent was erroneously described and specified as "G. Elias & Bros., Inc., of Buffalo, N. Y.", whereas said assignee should have been described and specified as "G. Elias & Bro., Inc., of Buffalo, New York, as shown by the records of assignments in this office; and that the said Letters Patent should be read with this correction therein that the same may conform to the record of the case in the Patent Office.

Signed and sealed this 30th day of July, A. D. 1929.

(Seal)

M. J. Moore,
Acting Commissioner of Patents.